United States Patent
Newton et al.

(10) Patent No.: US 11,818,229 B2
(45) Date of Patent: *Nov. 14, 2023

(54) CACHING IN A CONTENT DELIVERY FRAMEWORK

(71) Applicant: Level 3 Communications, LLC, Broomfield, CO (US)

(72) Inventors: Christopher Newton, Westlake Village, CA (US); William Crowder, Camarillo, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,675

(22) Filed: Aug. 19, 2022

(65) Prior Publication Data

US 2022/0407941 A1   Dec. 22, 2022

Related U.S. Application Data

(63) Continuation of application No. 16/909,245, filed on Jun. 23, 2020, now Pat. No. 11,425,223, which is a
(Continued)

(51) Int. Cl.
*H04L 67/02* (2022.01)
*H04L 67/5682* (2022.01)
(Continued)

(52) U.S. Cl.
CPC ............ *H04L 67/5682* (2022.05); *H04L 9/40* (2022.05); *H04L 67/02* (2013.01); *H04L 67/568* (2022.05); *H04L 67/34* (2013.01)

(58) Field of Classification Search
CPC ......... H04L 67/34; H04L 67/02; H04L 29/06; H04L 67/2842; H04L 67/2852
(Continued)

(56) References Cited

U.S. PATENT DOCUMENTS

| 6,965,968 | B1 | 11/2005 | Touboul |
| 7,587,515 | B2 | 9/2009 | Agarwalla |

(Continued)

FOREIGN PATENT DOCUMENTS

JP    2000181843    6/2000

OTHER PUBLICATIONS

Chinese Examination Report, dated Oct. 10, 2020, Application No. 201580068159.X, filed Dec. 14, 2015; 3 pgs.
(Continued)

*Primary Examiner* — Khanh Q Dinh

(57) ABSTRACT

A computer-implemented method, operable with a content delivery network (CDN) uses late binding of caching policies; by a caching node in the CDN, in response to a request for content, determining if the content is cached locally. When it is determined that said content is cached locally, then: determining a current cache policy associated with the content; and then determining, based on said current cache policy associated with the content, whether it is acceptable to serve the content that is cached locally; based on said determining, when it is not acceptable to serve the content that is cached locally, obtaining a new version of the content and then serving the new version of the content, otherwise when it is acceptable to serve the content that is cached locally, serving the content that is cached locally.

14 Claims, 4 Drawing Sheets

Related U.S. Application Data continuation of application No. 15/588,935, filed on May 8, 2017, now Pat. No. 10,701,173, which is a continuation of application No. 14/570,512, filed on Dec. 15, 2014, now Pat. No. 9,648,127.

(51) Int. Cl.
  *H04L 9/40* (2022.01)
  *H04L 67/568* (2022.01)
  *H04L 67/00* (2022.01)

(58) Field of Classification Search
  USPC .................. 709/220, 224, 226, 228, 229
  See application file for complete search history.

(56) References Cited

U.S. PATENT DOCUMENTS

| | | | |
|---|---|---|---|
| 7,730,154 B2 | 6/2010 | Agarwalla | |
| 7,752,395 B1 | 7/2010 | Fair | |
| 7,912,921 B2 | 3/2011 | O'Rourke | |
| 7,987,239 B2 | 7/2011 | Agarwalla | |
| 8,032,586 B2 | 10/2011 | Challenger | |
| 8,161,549 B2 * | 4/2012 | Lahti | H04L 49/90 713/153 |
| 8,164,549 B2 * | 4/2012 | Miyazawa | G09G 3/3233 345/82 |
| 8,812,695 B2 | 8/2014 | Luna | |
| 8,838,724 B2 * | 9/2014 | Xie | H04L 67/288 709/213 |
| 8,869,278 B2 * | 10/2014 | Lahti | H04L 69/167 726/23 |
| 8,930,494 B2 | 1/2015 | Knowles | |
| 8,984,166 B2 * | 3/2015 | Graham-Cumming | H04L 69/02 707/827 |
| 9,155,011 B2 | 10/2015 | Bruber | |
| 9,160,799 B2 * | 10/2015 | Toshniwal | H04L 65/1069 |
| 9,172,650 B2 | 10/2015 | Rajan | |
| 9,203,627 B2 | 12/2015 | Edstrom | |
| 9,241,044 B2 | 1/2016 | Shribman | |
| 9,270,700 B2 | 2/2016 | Medvinsky | |
| 9,292,441 B2 | 3/2016 | Lee | |
| 9,565,227 B1 * | 2/2017 | Helter | H04L 67/01 |
| 9,614,865 B2 | 4/2017 | Teddy | |
| 9,648,127 B2 * | 5/2017 | Newton | H04L 9/40 |
| 9,648,166 B1 * | 5/2017 | Moore | H04M 3/5158 |
| 9,678,841 B2 | 6/2017 | Araújo | |
| 9,984,166 B2 | 5/2018 | Even-Zohar | |
| 10,417,134 B2 | 9/2019 | Faldu | |
| 11,138,127 B2 * | 10/2021 | Gschwind | G06F 9/455 |
| 2002/0198953 A1 | 12/2002 | O'Rourke et al. | |
| 2003/0188009 A1 | 10/2003 | Agarwalla | |
| 2003/0188021 A1 | 10/2003 | Challenger | |
| 2006/0095532 A1 | 5/2006 | O'Rourke et al. | |
| 2008/0065273 A1 | 3/2008 | Gerrity | |
| 2010/0124233 A1 | 5/2010 | Shi | |
| 2011/0088043 A1 | 4/2011 | Lind | |
| 2011/0161294 A1 | 6/2011 | Vengerov | |
| 2012/0198050 A1 | 8/2012 | Maki et al. | |
| 2012/0209942 A1 | 8/2012 | Zehavi et al. | |
| 2012/0215779 A1 | 8/2012 | Lipstone | |
| 2013/0219441 A1 * | 8/2013 | Zhang | H04N 21/25808 725/97 |
| 2013/0254343 A1 | 9/2013 | Stevens et al. | |
| 2014/0129779 A1 | 5/2014 | Frachtenberg | |
| 2014/0215802 A1 | 8/2014 | Gonzalez | |
| 2014/0245359 A1 | 8/2014 | de Foy | |
| 2014/0280679 A1 * | 9/2014 | Dey | H04L 67/568 709/213 |
| 2014/0283065 A1 | 9/2014 | Teddy | |
| 2014/0365683 A1 | 12/2014 | Bergman | |
| 2015/0058989 A1 * | 2/2015 | Lahti | H04L 69/167 726/23 |
| 2015/0067819 A1 | 3/2015 | Shribman | |
| 2015/0207896 A1 * | 7/2015 | Llorca | H04L 67/60 709/213 |
| 2015/0333930 A1 | 11/2015 | Aysola | |
| 2015/0334094 A1 | 11/2015 | Suresh | |
| 2015/0347248 A1 | 12/2015 | Araujo | |
| 2016/0072186 A1 * | 3/2016 | Wang | G01S 3/14 342/368 |
| 2016/0103916 A1 | 4/2016 | Even-Zohar | |
| 2016/0105319 A1 * | 4/2016 | Meeker | H04L 41/0846 709/204 |
| 2016/0173634 A1 | 6/2016 | Newton et al. | |
| 2017/0244804 A1 | 8/2017 | Newton et al. | |
| 2017/0351020 A1 * | 12/2017 | Fan | G02B 6/002 |
| 2018/0129613 A1 | 5/2018 | Faldu | |
| 2020/0322446 A1 | 10/2020 | Newton | |

OTHER PUBLICATIONS

Chinese First Office Action, dated Mar. 3, 2020, Application No. 201580068159.X, filed Dec. 14, 2015; 14 pgs.

Extended European Search Report, dated May 3, 2018, Application No. 15870782.8, filed Dec. 14, 2015; 7 pgs.

International Preliminary Report on Patentability dated Jun. 20, 2017, Int'l Appl. No. PCT/US15/65476, Int'l Filing Date Dec. 14, 2015; 6 pgs.

International Search Report dated Feb. 10, 2016, Int'l Appl. No. PCT/US15/065476, Int'l Filing Date Dec. 14, 2015; 3 pgs.

Japan Notice of Reasons for Refusal, dated Oct. 28, 2019, Application No. 2017-530734, filed Dec. 14, 2015; 5 pgs.

Written Opinion of the International Searching Authority dated Feb. 10, 2016, Int'l Appl. No. PCT/US15/065476, Int'l Filing Date Dec. 14, 2015; 4 pgs.

* cited by examiner

CACHING IN A CONTENT DELIVERY FRAMEWORK

BACKGROUND OF THE INVENTION

Field of the Invention

This invention relates to content delivery and content delivery networks, and, more specifically, to caching in content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CD means Content Delivery;
CDN means Content Delivery Network;
HTTP means Hyper Text Transfer Protocol;
HTTPS means HTTP Secure;
TTL means time to live;
URI means Uniform Resource Identifier;
URL means Uniform Resource Locator.

Background and Overview

A content delivery network (CDN) distributes content (e.g., resources) efficiently to clients on behalf of one or more content providers, preferably via a public Internet. Content providers provide their content (e.g., resources) via origin sources (origin servers or origins), and a CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
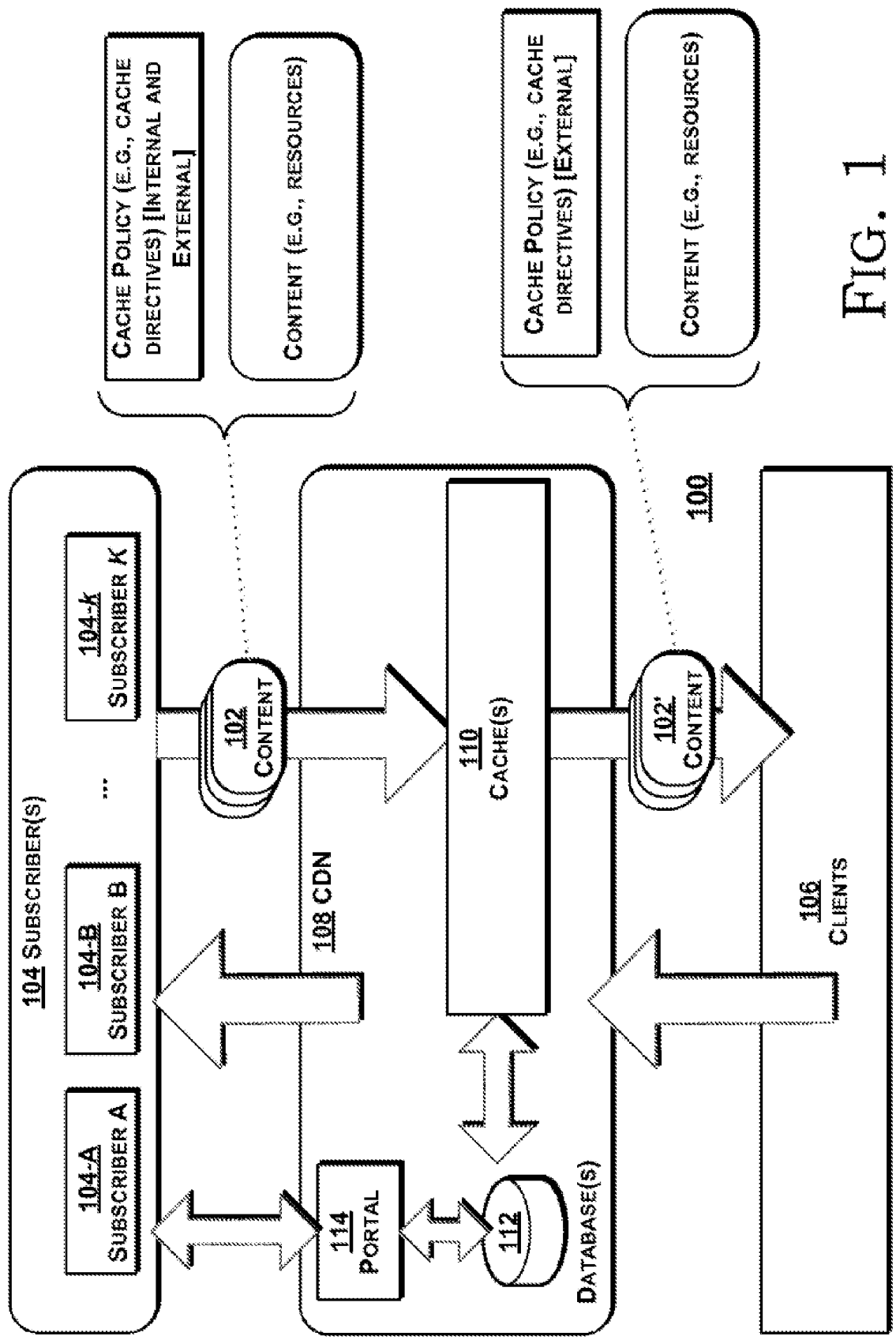
FIG. 1 shows aspects of an exemplary content delivery framework in accordance with an exemplary embodiment hereof.
Figure 2:
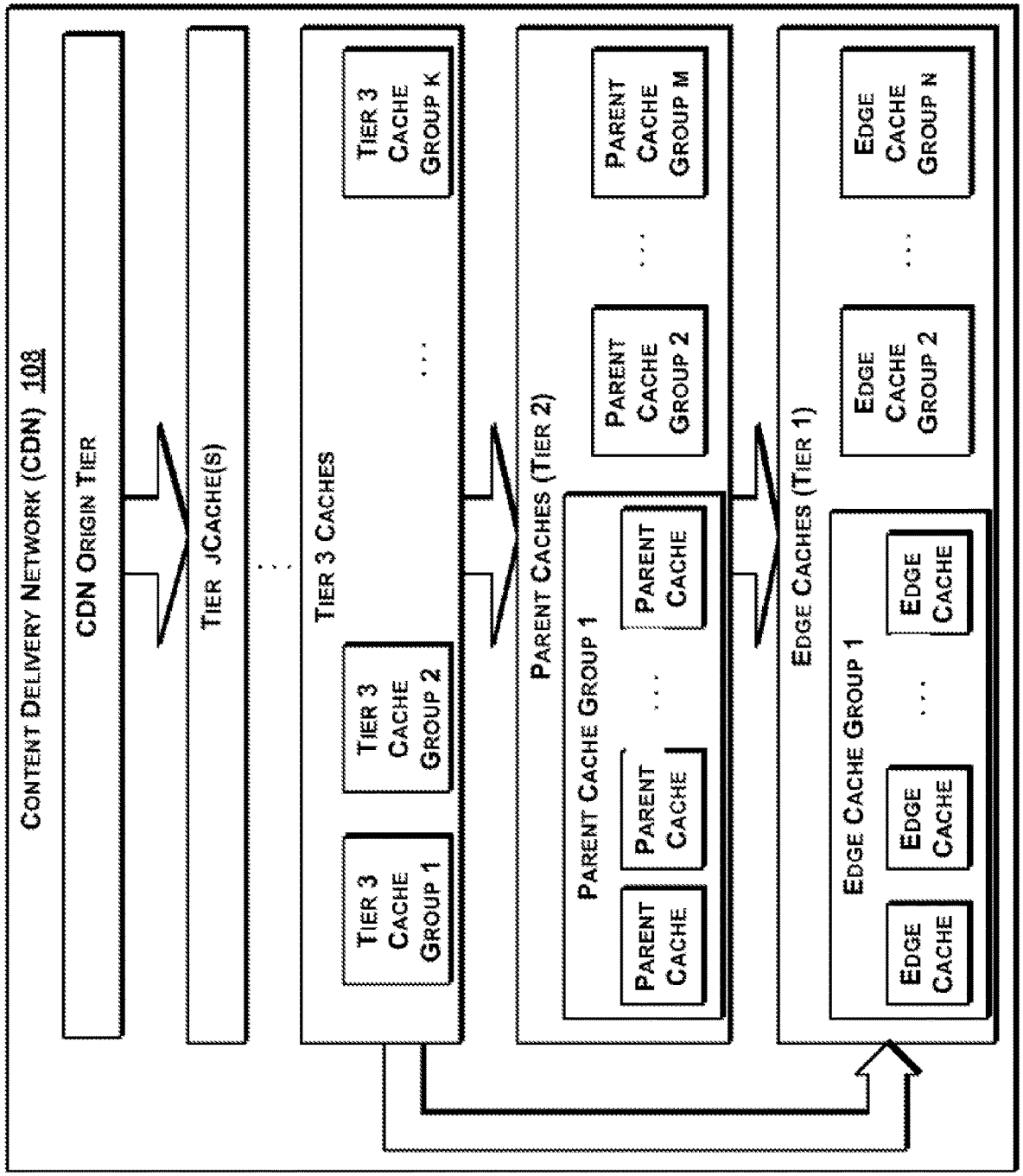
FIG. 2 shows aspects of an exemplary content delivery network (CDN) according to exemplary embodiments hereof.

With reference to FIG. 1 which shows an exemplary content delivery framework 100 according to exemplary embodiments hereof, content 102 associated with one or more subscribers 104 may be distributed to clients 106 via one or more CDNs 108. The CDN(s) 108 may be any kind of CDN and may include sub-CDNs, delegated CDNs, partial CDNs, etc. Exemplary CDNs are described in U.S. Published Patent Applications Nos. US 2013-0159472 and US 2013-0159473, both filed Dec. 12, 2012; and No. US 2014-0344399 A1, filed Jun. 17, 2014; and U.S. Pat. No. 6,185,598, filed Feb. 10, 1998, the entire contents of each of which has been fully incorporated herein by reference for all purposes. FIG. 2 shows aspects of an exemplary CDN 108 according to exemplary embodiments hereof.

As used herein, clients are agents (e.g., browsers, set-top boxes, or other applications) used, e.g., by end users to issue requests (e.g., DNS and HTTP requests) within the system. When no CDN or other intermediaries are in use, such requests may go directly to the subscriber's own servers (e.g., their origin servers) or to other components in the Internet. When a content provider subscribes to CD services (e.g., as described U.S. Published Patent Applications Nos. US 2013-0159472 and US 2013-0159473), various requests may go to intermediate CD services that may map the end-user requests to origin requests, possibly transforming and caching content along the way.

Each distinct origin (e.g., origin server) is typically associated with one subscriber, but a subscriber may be associated with any number of origins, including subscriber-owned and CDN provided origins.

The physical origins with which the CDN interacts may actually be intermediaries that acquire content from a chain of intermediaries, perhaps, e.g., elements of a separate content acquisition system that ultimately terminates at a subscriber's actual origin servers. As far as the internals of the CDN are concerned, however, the origin is that service outside the system boundary from which content is directly acquired.

As used herein, an end user is an entity (e.g., person or organization) that ultimately consumes some Internet service (e.g., a web site, streaming service, etc.) provided by a service provider entity. This provider entity is sometimes referred to as a subscriber in this description because they subscribe to CDN services in order to efficiently deliver their content, e.g., from their origins to their consumers. A CDN may provide value-added mediation (e.g., caching, transformation, etc.) between its subscribers and their end-users.

Caching

Content (e.g., a resource) may be cached both within a CDN and by other entities, including by a client to which that content has been served. As should be appreciated, a client may also be an entity within a CDN. In some cases content may be cached by intermediaries both within a CDN and external to the CDN. With reference again to the content delivery framework 100 in FIG. 1, at least some content 102 may be cached within the CDN(s) 108, e.g., CDN caches or cache services 110.

Cached and cacheable content typically has a caching policy associated therewith, and it is generally expected that entities that process such content will obey those caching policies. Caching policies of particular interest here include those policies relating to the expiration of content, it being appreciated that it is generally undesirable to serve stale or expired content or to serve content in a manner that is inconsistent with the caching policy associated with that content.

Caching policies may be specified as cache directives associated with content, and cache directives may depend, e.g., on the type of resource. For example, HTTP resources (including HTTPS resources) preferably use conventional HTTP caching directives such as described in Internet Engineering Task Force (IETF) Request for Comments (RFC) 7234, "Hypertext Transfer Protocol (HTTP/1.1): Caching," the entire contents of which are hereby fully incorporated herein by reference for all purposes. As is known, in the case of HTTP resources the cache directives may be provided via headers associated with the resources. If no cache directives are provided with a resource then an entity (e.g., a cache node) may use default caching policies for resources of that type or from that provider. The entity may determine the default caching policies from another source. In general, a cache directive (or caching policy) associated with content (e.g., a resource or set of resources) may be provided with that content (e.g., as a header in the case of an HTTP resource) and/or be available from a location or entity (e.g., database or the like) distinct from the content.

A CDN may cache content on behalf of its subscribers, and preferably a CDN allows for specification, e.g., within a CDN node, of a cache expiration policy of content the CDN caches on behalf of its subscribers. A CDN may have or support an internal caching policy for content (e.g., a resource or set of resources), where the internal caching policy is a policy honored by the CDN cache that is separate and possibly distinct from an external caching policy for the same content (e.g., the caching policy that is conveyed with the content when being delivered to a client).

In some embodiments a CDN may support a subscriber or other user or entity setting or overriding an internal caching policy for resources. For example, in such a system, a CDN customer/subscriber may access a self-service portal or the like (e.g., via an Application Program(ing) Interface—API) and override a caching policy from the origin server for some or all of their content. For example, a particular CDN subscriber may use a portal to set a caching policy for a particular kind of their content (e.g., for their PDF files or the like), e.g., so that those files are cached for a particular time period (e.g., a week, an hour, etc.).

Rather than try to invalidate cached content (e.g., resources) every time a caching policy for that content is set, as described herein, the CDN's internal request processing process may determine the caching policy of requested content at request time rather than at fill time. In effect, the request processing uses a late-binding of the caching policy, thereby assuring that the latest internal caching policy is used without having to force invalidations (a potentially expensive process).

Cache directives similar to those used for external caching may be used for internal cache policies. It should be appreciated, however, that in order to conveniently distinguish internal from external cache policy directives, a CDN will use different names for the internal cache policies and/or provide these policies (e.g., via an internally used HTTP header). In this manner the external cache policies may be provided to external entities while the internal cache policies may be acted upon by the CDN entities (e.g., caches).

For example, with reference again to the content delivery framework 100 in FIG. 1, content 102 from the subscriber(s) 104 may have internal and/or external cache policies (e.g., cache directives) associated therewith. Content 102' provided by the CDN 108 to the client(s) 106 preferably includes external cache policies (e.g., cache directives). The internal cache policies may be provided with the content 102' to the client(s) 106, since these policies preferably use directives that the client will not recognize or act on. The cache policies associated with particular content may be included with the content (e.g., in the case of HTTP resources, as HTTP headers), or they may be located elsewhere. A CDN may apply a default caching policy to content in the absence of specific directives associated with that content.

In some embodiments hereof the caching policies (internal and external) associated with content (e.g., a resource or group of resources) may be stored in a database (sometimes referred to herein as a RuleBase). When a client request for a resource is being processed the RuleBase may be accessed in order to lookup/obtain the required caching policies (internal and external). With reference again to FIG. 1, cache(s) 110 may access one or more databases 112 in order to obtain information about internal and/or external caching policies associated with content.

As noted above, in some embodiments a CDN may support a subscriber or other user or entity setting or overriding an internal caching policy for resources, e.g., via a self-service portal or the like (e.g., via an API). An exemplary portal 114 is shown in FIG. 1 whereby subscribers may access and/or modify caching policies associated with their content (i.e., with content to be served by the CDN on their behalf).

Thus, according to exemplary embodiments hereof, as a request for content is received at a CDN node from a client, the node will determine the caching expiration policy for that content (e.g., is there an override policy and if so what is it; otherwise a policy provided by the origin server should be honored). The caching policy for content may be determined, e.g., by access to the RuleBase.

This policy is then conveyed to the caching node (also referred to as a cache), e.g., as one or more cache constraints. The cache may then use those constraint(s) to determine if the content it has on hand (if any) can be returned to the requesting client, or if a refresh/reload etc. is required. As should be appreciated, if the node does not have the resource available then it needs to obtain the resource regardless of the internal caching policy, although it may honor the then-current caching policy.

For example, if the configuration specifies an internal caching policy of "one hour" then that policy is conveyed to the cache when the application requests the resource. If the cache has the resource, then it compares the original fill time of the resource it has to the specified policy (and the current time) to determine if the resource it has can be served from the cached resource or if it needs to be refreshed/reloaded first (or possibly asynchronously).

If the requested resource is not in cache, then a fill is made and stored in cache if and only if the specified policy allows or requires it (e.g., if the response is marked as no-store and there is no internal policy provided that specifies a caching policy, then do not store it, etc.).

Absent any internal caching policy override, the caching rules of the responses from the origin would still apply (i.e., the cache would return the resource if it saw that the resource was fresh and had no constraints).

Any external policy would be applied as the resource is delivered to the client. This allows for different classes of client to specify different constraints. For instance, in some cases an internal request for a resource could request the resource in such a way as to always prevent a refresh from occurring; or could similarly require a refresh regardless of what the cache considers the expiration of the resource to be.

Figure 3:
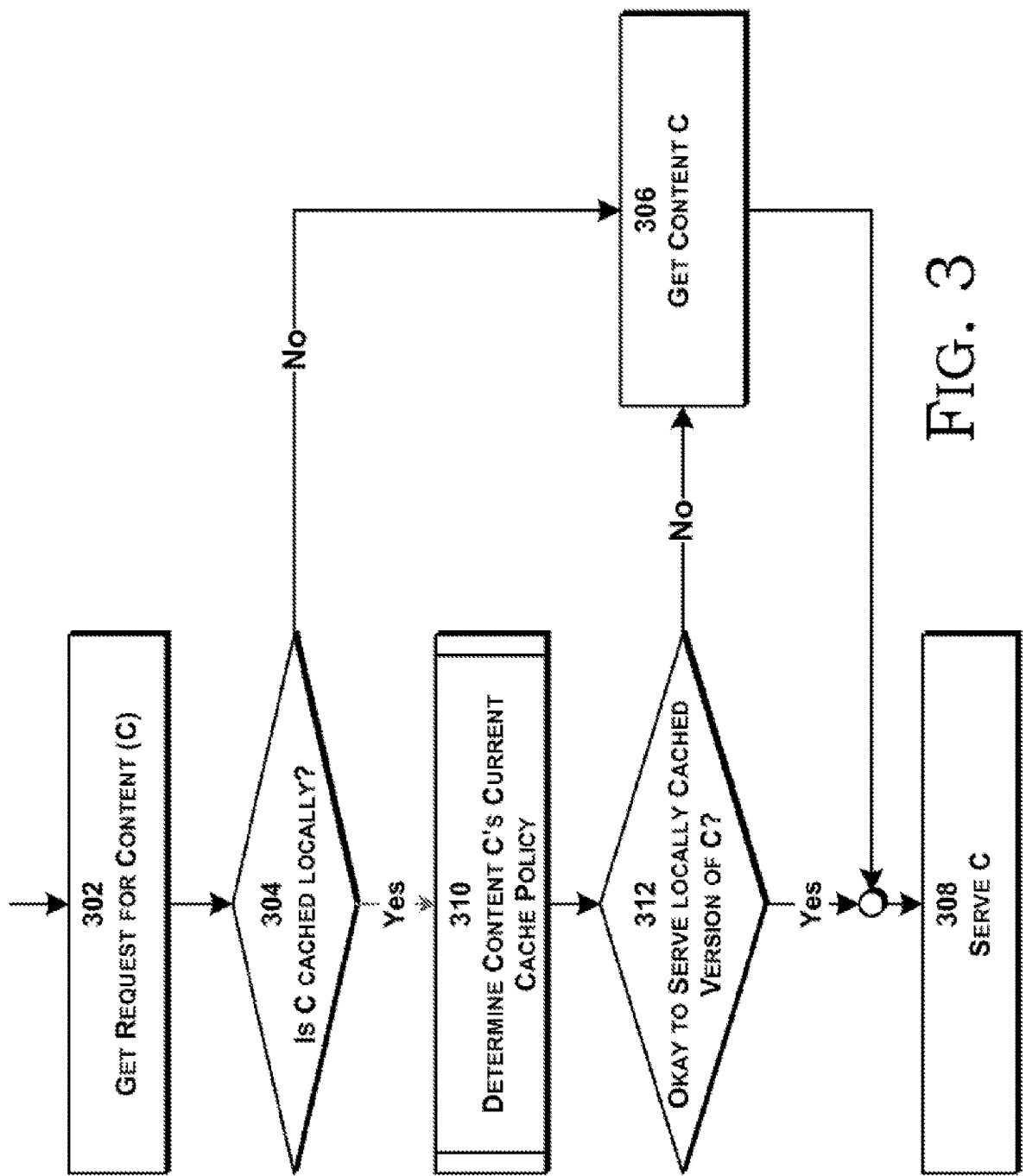
FIG. 3 is a flowchart of aspects of processing according to exemplary embodiments hereof.

FIG. 3 is a flowchart of aspects of processing according to exemplary embodiments hereof. As shown in the flowchart in FIG. 3, a cache (caching node) in the CDN receives a request for content (C) (at 302). The request may have reached the caching node in any manner (e.g., via a rendezvous system of the CDN). The content C may be or comprise one or more resources and the request may take the form of a URI or URL specifying those resources. The cache determines (at 304) whether the requested content C is cached locally. If it is determined (at 304) that no locally cached copy of C is available then the node gets a copy of the content C, preferably along with C's caching policy (at 306). The node may obtain the copy of C from an appropriate fill-authoritative node in the CDN, it being understood that the fill-authoritative node will also check that its cached version, if any, is not stale. In other words, the late binding cache policy checking is preferably performed by all intermediate nodes that provide a copy of requested content, whether they are providing that content to an external or internal client.

On the other hand, if it is determined (at 304) that there is a locally cached copy of the requested content C, then the node obtains (at 310) the current cache policy associated with content C (e.g., from the database 112). The current cache policy is then used (at 312) to determine whether the node can serve the currently cached version of the requested content (C). If, based on the current cache policy obtained/determined in 310, it is not okay to serve the locally cached version of the requested content C, then the node gets the current version of the content C (at 306), as described above and serves the current version of C (at 308). On the other hand, if it is determined (at 312) that it is acceptable for the node to serve the currently-cached version of the content C (based, at least in part, on the current cache policy for C obtained at 310), then the currently-cached version of the content C is served (at 308).

Caching policies specified in the RuleBase, e.g., policies that are specified based on mime type and/or status code (negative caching being a particular case of this) may be dealt with by extending the constraints passed to the cache. For example, "if cached for no more than an hour, unless it is text/html in which case consider it non-cacheable or text/* in which case cacheable for one day." It should be appreciated that a suitably terse syntax would apply to and be used for such constraints.

In some cases the RuleBase constraint set may be compilable at sequence generation time since it typically applies property wide—there would need to be provision for additional filters however (the set should be limited and readily selectable amongst during request preparation); negative caching could similarly be handled by including a negative TTL value and a list of status codes to the constraint set.

As will be appreciated, a downside of this approach is that the caching policy determination must be made for every request. This is unlikely to be free, and could be relatively costly. On the other hand, the benefit of having relatively instant policy updates may not be big since policy updates may be rare. To mitigate that cost, an implementation may store a configuration version number with each resource and only recalculate it if the configuration has changed. For example, such an approach would call into the caching engine with the current configuration version number and have the cache compare that to the configuration number associated with the resource. If the configuration numbers are the same, then use the policy information attached to the resource, otherwise call back out to get the current set of constraints. Effectively this approach will only process the RuleBase to get the constraints if it looks like they have changed. In some implementations the version number may be or comprise a checksum or hash or the like of the caching policy (as well as or instead of a sequence number). The hash may be a cryptographic hash such as an MD5 or SHA or the like. In this manner a change that is subsequently undone may be seen as matching a prior version.

Such a system would deal with odd constraints (e.g., the type of internal request that never wants to cause a refresh) by entering some sentinel sequence number that causes the current constraint to be requested. To support such an approach, the interface to the cache may be such that the request would be allowed to convey a sequence number and/or a set of constraints. If the RuleBase needs to be processed for every request anyway, then the constraints can be gathered during that and conveyed on the request to the cache, which could just ignore it if the sequence number hasn't changed rather than calling out from the cache.

Computing

Figure 4:
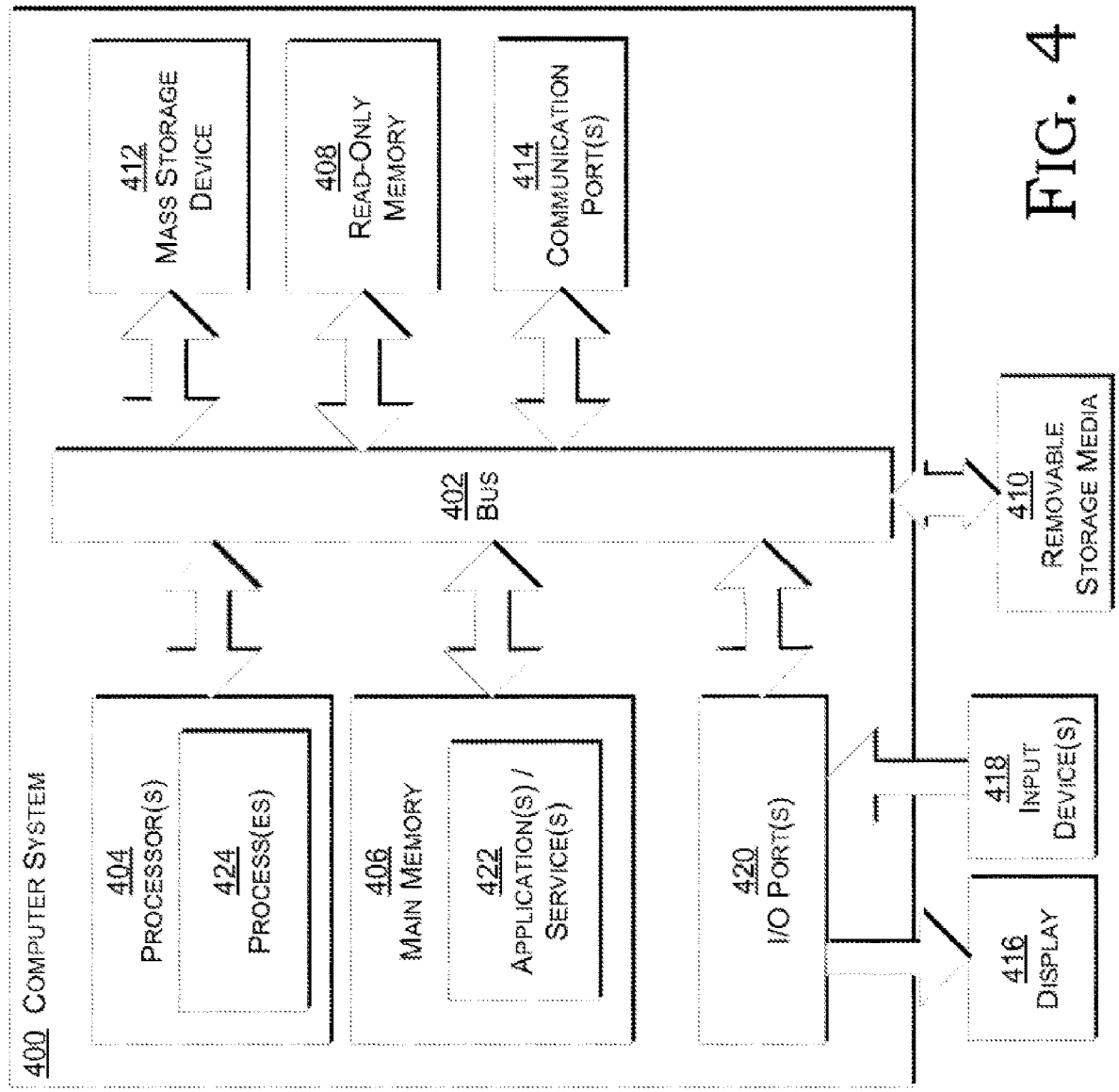
FIG. 4 depicts aspects of computing according to exemplary embodiments hereof.

FIG. 4 is example schematic diagram of a computing system 400 implementing a proxy, a parent server, or other computing device that may be used to perform the processes discussed herein. The computing system includes a bus 402 (i.e., interconnect), at least one processor 404, at least one communication port 414, a main memory 406, a removable storage media 410, a read-only memory 408, and a mass storage device 412. Processor(s) 404 can be any known processor, such as, but not limited to, an Intel® Itanium® or Itanium 2® processor(s), AMD® Opteron® or Athlon MP® processor(s), or Motorola® lines of processors. Communication port 414 can be any of an RS-232 port for use with a modem based dial-up connection, a 10/100 Ethernet port, a Gigabit port using copper or fiber, or a USB port. Communication port(s) 414 may be chosen depending on a network such as a Local Area Network (LAN), a Wide Area Network (WAN), or any network to which the computer system connects. The server may be in communication with peripheral devices (e.g., display screen 416, input device 418 via Input/Output (I/O) port 420.

Main memory 406 can be Random Access Memory (RAM) or any other dynamic storage device(s) commonly known in the art. Read-only memory 408 can be any static storage device(s) such as Programmable Read-Only Memory (PROM) chips for storing static information such as instructions for processor 404. Mass storage device 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 402 communicatively couples processor(s) 404 with the other memory, storage and communications blocks. Bus 402 can be a PCI/PCI-X, SCSI, or Universal Serial Bus (USB) based system bus (or other) depending on the storage devices used. Removable storage media 410 can be any kind of external hard drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory may be encoded with one or more applications/services 422 that support functionality as discussed above with respect to the various figures and elsewhere. For example, in one embodiment, the application 422 may include or otherwise implement the various processes and/or instructions described herein. The application 422 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 404 accesses main memory 406 via the use of bus 402 in order to launch, run, execute, interpret or otherwise perform the logic instructions of the application 422. Execution of the application 422 produces processing functionality in application process 424. In other words, the process 424 represents one or more portions of the application 422 performing within or upon the processor(s) 404 in the computer system 400.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Conclusion

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, operable with a content delivery network (CDN), the method comprising, by a node in the CDN:
    (A) in response to a request for content, determining if the content is cached locally;
    (B) when it is determined that said content is cached locally, then:
        (B)(1) determining a current cache policy associated with the content; and then
        (B)(2) determining, based on said current cache policy associated with the content, whether it is acceptable to serve the content that is cached locally;
        (B)(3) based on said determining in (B)(2),
    (i) when it is not acceptable to serve the content that is cached locally, obtaining a new version of the content and then serving the new version of the content, and
    (ii) when it is acceptable to serve the content that is cached locally, serving the content that is cached locally,
    wherein the current cache policy includes an internal caching policy honored by the node when caching content and a separate and distinct internal caching policy honored when the content is served.

2. The method as recited in claim 1 further comprising:
    (C) when it is determined that said content is not cached locally, then (C)(1) obtaining the content and then (C)(2) serving the content obtained in (C)(1).

3. The method as recited in claim 1 wherein the request comprises an HTTP request and wherein the content comprises one or more resources.

4. The method as recited in claim 1 wherein the current cache policy is determined from a location distinct from the node.

5. The method as recited in claim 4 wherein the location is a database.

6. The method as recited in claim 1 wherein the cache policy relates to caching content within the CDN.

7. The method as recited in claim 6 wherein the cache policy also relates to caching content outside the CDN.

8. A computer program product having computer readable instructions stored on non-transitory computer readable media, the computer readable instructions including instructions for implementing a computer-implemented method, said method operable on a device comprising hardware including memory and at least one processor and running a service on said hardware, said method operable in a content delivery service (CDN), said method comprising:
(A) in response to a request for content, determining if the content is cached locally;
(B) when it is determined that said content is cached locally, then:
(B)(1) determining a current cache policy associated with the content; and then
(B)(2) determining, based on said current cache policy associated with the content, whether it is acceptable to serve the content that is cached locally;
(B)(3) based on said determining in (B)(2),
(i) when it is not acceptable to serve the content that is cached locally, obtaining a new version of the content and then serving the new version of the content, and
(ii) when it is acceptable to serve the content that is cached locally, serving the content that is cached locally,
wherein the current cache policy includes an internal caching policy honored by the node when caching content and a separate and distinct internal caching policy honored when the content is served.

9. The computer program product as recited in claim 8 wherein the method further comprises:
(C) when it is determined that said content is not cached locally, then (C)(1) obtaining the content and then (C)(2) serving the content obtained in (C)(1).

10. The computer program product as recited in claim 8 wherein the request comprises an HTTP request and wherein the content comprises one or more resources.

11. The computer program product as recited in claim 8 wherein the current cache policy is determined from a location distinct from the node.

12. The computer program product as recited in claim 11 wherein the location is a database.

13. The computer program product as recited in claim 8 wherein the cache policy relates to caching content within the CDN.

14. The computer program product as recited in claim 13 wherein the cache policy also relates to caching content outside the CDN.

* * * * *